(No Model.) 3 Sheets—Sheet 1.

F. BATTER.
APPARATUS FOR PRESERVING PILES.

No. 452,513. Patented May 19, 1891.

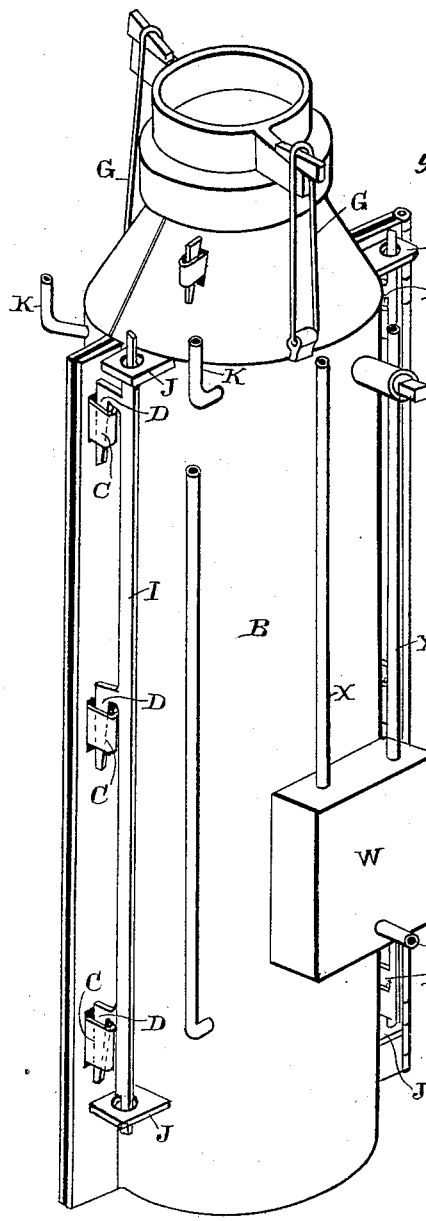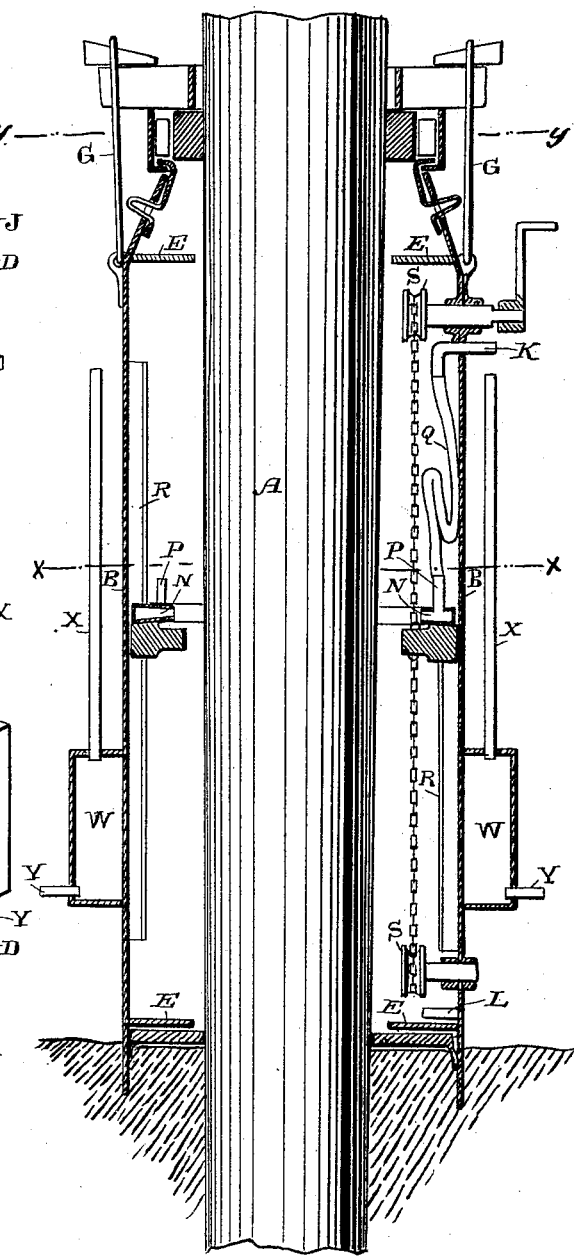

(No Model.)  3 Sheets—Sheet 3.

F. BATTER.
APPARATUS FOR PRESERVING PILES.

No. 452,513. Patented May 19, 1891.

Witnesses,

Inventor
Frank Batter
By Dewey & Co
Att'ys

UNITED STATES PATENT OFFICE.

FRANK BATTER, OF MARSHFIELD, OREGON.

APPARATUS FOR PRESERVING PILES.

SPECIFICATION forming part of Letters Patent No. 452,513, dated May 19, 1891.

Application filed December 10, 1890. Serial No. 374,230. (No model.)

*To all whom it may concern:*

Be it known that I, FRANK BATTER, a citizen of the United States, residing at Marshfield, Coos county, State of Oregon, have invented an Improvement in Apparatus for Preserving Piles; and I hereby declare the following to be a full, clear, and exact description of the same.

My invention relates to an apparatus for treating piles for the purpose of protecting them from the ravages of marine insects after the piles have been driven into place.

It consists of an inclosing casing, devices for fitting it around each pile, devices for expelling the water from the inclosure so formed, and applying a current of hot steam to destroy the insects, and other devices for applying a protective solution or coating, together with certain details of construction, which will be more fully described hereinafter.

Figure 1:
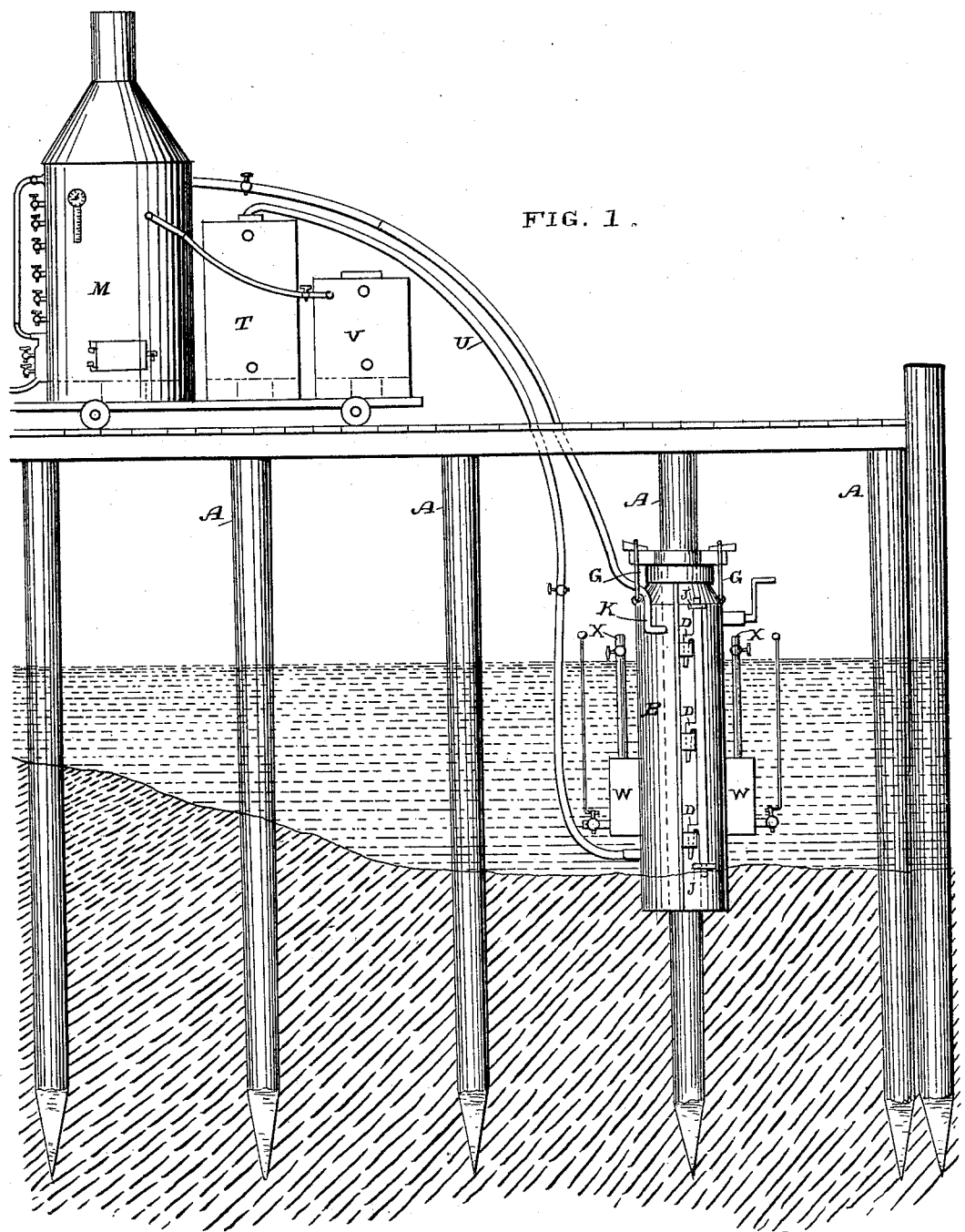
Figure 4:
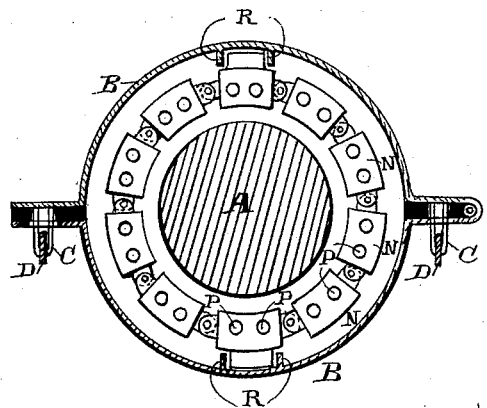
Figure 5:
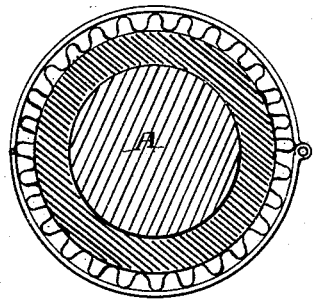
Figure 6:
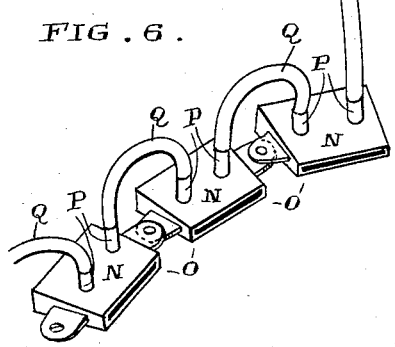
Figure 7:
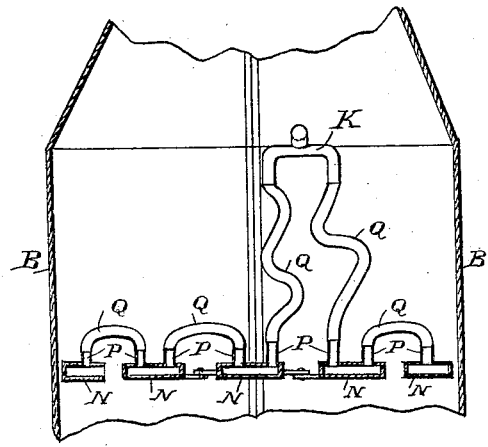

Referring to the accompanying drawings for a more complete explanation of my invention, Figure 1 is a side elevation of my apparatus showing a section of the inclosing casing fitted upon a pile and connected pipes and boilers. Fig. 2 is an enlarged view of the casing. Fig. 3 is a vertical section of the same. Fig. 4 is a horizontal section taken through the center of the casing on the line $x\ x$ of Fig. 3. Fig. 5 is a horizontal section taken through the upper part on the line $y\ y$ of Fig. 3. Fig. 6 is a perspective view of portion of the encircling ring of nozzles. Fig. 7 shows a portion of the casing with a section of the nozzles.

The ravages of the teredo, limnoria, and other marine worms and insects frequently take place in spite of the best protection that that can be given to the piles composing a wharf.

In my invention the piles A are first driven to form a wharf or other structure, either after having been treated by any of the known protecting processes or devices or without any protection whatever, and these piles will last for a considerable length of time before being seriously attacked. The time during which the piles will last depends upon the activity of the marine insects in the particular locality, and this being known when they have commenced to attack the piles I apply my apparatus, which consists of a case B, formed of sheet metal in two semi-cylindrical halves hinged together at one side and having flanges at their meeting edges, between which is fixed any material, which will make a comparatively tight joint when the two are closed together.

C C are staples fixed to the flanges on one side and projecting through slots which are made in the flanges upon the opposite side, and D are wedge-shaped slides which pass through these staples and draw the flanges closely together after the apparatus has been fitted around the pile.

This casing is of sufficient length so that when its bottom rests in the mud in which the pile is driven the upper end will extend slightly above the surface of the water, and the casing is of sufficient diameter to inclose any size of pile which is to be operated upon. Within this casing are guides E, which will center the pile within the casing when the latter is closed together. The top of the casing is closed, so as to fit around the pile and make a tight joint by having the upper end made conical, so as to fit approximately around the pile, and packing of any suitable or desirable description may be fitted upon this upper end surrounding the pile closely, said packing being secured in any suitable way. In the present case I have shown bails or loops G, hinged upon opposite sides of the casing and extending sufficiently above the top to admit wedges or bars which may pass through these loops, extending above the packing, and by reason of the wedges the packing can be forced as tightly as desirable around the pile and upon the top of the casing.

In order to properly guide the locking-wedges by which the two longitudinal flanges of the casing are drawn together these wedges are connected with a vertical rod I, which passes through guides J at the top and bottom, so that when it is pressed downward in these guides it will direct the wedges into the loops and close the flanges firmly together.

A pipe or pipes K lead into the upper part of the casing, and another pipe or pipes L connect with the lower part. One of the pipes leading into the upper part of the casing is connected by a flexible tube or otherwise with the steam-boiler M, which, with the other necessary apparatus, is mounted upon wheels, so that it can be rolled out upon the wharf to any desired position. Steam, being turned into the pipes from the boiler, will pass into upper end of the casing, and by its pressure will force the water out through the pipes which connect with the bottom of the casing, and the heat of the steam within the casing surrounding the pile will be so great as to destroy any animal life or marine worms or insects which may be found upon or within the body of the pile. In order to insure a sufficient heat being thrown against the pile, I have shown flat nozzles N, hinged to a frame which is formed of sections O, so as to surround the pile when the casing is closed with these nozzles directed toward the pile and but a short distance away from its surface. Pipes P connect with each of these nozzles, and all of these pipes receive steam from a common source through a flexible connecting-pipe Q, leading from one of the pipes which open into the top of the casing. In order to move this device up and down so as to expose every portion of the pile to its action, I have shown vertical guides R formed within the casing, and slides to which the sectional frame which supports the nozzles is attached move within these guides. S S are two pulleys at top and bottom, and arranged with relation to these guides and the sectional frame, so that the latter may be moved up and down by exterior cranks or other suitable means, to bring the nozzles opposite all portions of the pile within the casing. After the pile has been sufficiently exposed to the steam-jets to raise its temperature and destroy any worms or insects which may be found burrowing into its surface, a solution which may consist of tobacco-juice, corrosive sublimate, or any other well-known destructive material may be injected into the casing, the steam-supply being cut off. This liquid is contained within a tank T, mounted upon the same truck with the steam-boiler, and is conveyed by pipes U in the same manner that the steam is conveyed, being delivered into one of the pipes or passages at the lower end of the casing, and it may be withdrawn by means of any well-known form of pump through another pipe connected with the upper end of the casing and again returned to the boiler, so that it can be used over and over again. After this application, if desired, a coating of tar or a mixture of any of the various compounds which are in use for the purpose may be delivered into the casing around the pile from a third tank V, also mounted upon the same truck with the boiler and the tank T. After this application has been properly made the casing can be removed and applied to the next pile.

In order to facilitate the movement of the casing from one pile to another, I have shown floats W of considerable size fixed upon the sections of the casing, with pipes X, through which air under pressure may be delivered into the floats, the water which is within them being forced out through other pipes Y. When full of air these floats are sufficient to counterbalance the weight of the casing, and it may be easily floated to the next pile to which it is to be applied and sunk and fitted around the pile by discharging the air from the floats and locking the flanges together again, as previously described.

By this device piles which have been driven either with or without treatment may be successfully treated while in place and sufficiently protected from further attacks by marine worms or insects, while at the same time all insects which may be concealed in the pile at the time will be destroyed.

Having thus described my invention, what I claim as new, and desire to secure by Letters Patent, is—

1. A device for treating piles after they have been driven, consisting of the sectional casing adapted to be fitted around the pile, a means for locking the sections together and producing tight joints, a steam-boiler, and pipes leading therefrom, pipes whereby steam may be admitted into the upper part of the casing, other pipes through which the water is forced out from the interior of the casing, tanks containing a preservative solution, and pipes through which a solution or protective coating may afterward be applied to the surface of the pile below the water-line, substantially as herein described.

2. The casing consisting of two sections having longitudinal flanges hinged together with staples and locking-wedges, a conical top flange at the upper end of the casing adapted to surround a pile, a packing fitted to said flange, and the links and wedge-shaped bars, whereby said packing is forced into place to make a tight joint, substantially as herein described.

3. The combination of a hinged sectional casing for surrounding the pile and having the locking and packing devices whereby tight joints are made, pipes whereby steam or preservative liquid is introduced within the casing around the pile, vertical guides fixed within the casing, a sectional frame having slides moving in said guides, nozzles fixed to said frame with their discharge ends directed toward the pile, and pipes whereby said nozzles are supplied with steam while being moved up and down so as to expose the surface of the pile to steam-jets, substantially as herein described.

4. The combination of a casing for surrounding the pile, the vertical guides, with slides and frame carrying the steam-jet nozzles, pulleys fixed at top and bottom within the casing, and chains passing around said pulleys and connected with the slides, so that they and the nozzles may be moved up and down within the casing, substantially as herein described.

In witness whereof I have hereunto set my hand.

FRANK BATTER.

Witnesses:
S. H. NOURSE,
WM. F. BOOTH.